(12) United States Patent
Harashina et al.

(10) Patent No.: US 7,041,718 B2
(45) Date of Patent: *May 9, 2006

(54) POLYACETAL RESIN COMPOSITION AND MOLDINGS

(75) Inventors: Hatsuhiko Harashina, Fuji (JP);
Hayato Kurita, Fujinomiya (JP);
Tatsuya Yamada, Ihara-gun (JP)

(73) Assignee: Polyplastics Co., Ltd., Osaka (JP)

( * ) Notice: Subject to any disclaimer, the term of this patent is extended or adjusted under 35 U.S.C. 154(b) by 28 days.

This patent is subject to a terminal disclaimer.

(21) Appl. No.: 10/655,034

(22) Filed: Sep. 5, 2003

(65) Prior Publication Data

US 2005/0075429 A1 Apr. 7, 2005

Related U.S. Application Data

(62) Division of application No. 09/319,186, filed as application No. PCT/JP97/04758 on Dec. 22, 1997, now Pat. No. 6,642,289.

(30) Foreign Application Priority Data

Dec. 27, 1996 (JP) ................... 8-349920

(51) Int. Cl.
*C08K 5/34* (2006.01)
(52) U.S. Cl. ..................... 524/106; 524/593
(58) Field of Classification Search ............. 524/106, 524/593
See application file for complete search history.

(56) References Cited

U.S. PATENT DOCUMENTS

| | | | |
|---|---|---|---|
| 2,810,708 A | 10/1957 | Kubico et al. |
| 2,893,972 A | 7/1959 | Kubico et al. |
| 3,103,499 A | 9/1963 | Dolce et al. |
| 3,278,240 A | 10/1966 | Boyd |
| 3,296,194 A | 1/1967 | Wagner et al. |
| 3,298,993 A | 1/1967 | Dakli et al. |
| 3,505,280 A | 4/1970 | Hermann et al. |
| 3,678,047 A | 7/1972 | Kletecka et al. |
| 3,940,365 A | 2/1976 | Grossmann et al. |
| 3,963,668 A | 6/1976 | Wurmb et al. |
| 5,866,671 A | 2/1999 | Shinohara et al. |

FOREIGN PATENT DOCUMENTS

| | | |
|---|---|---|
| GB | 996252 | 6/1965 |
| JP | 41-8783 | 5/1966 |
| JP | 48-88136 | 11/1973 |
| JP | 51-19771 | 2/1976 |
| JP | 51-36453 | 3/1976 |
| JP | 51-66329 | 6/1976 |
| JP | 52-25771 | 2/1977 |
| JP | 52-25772 | 2/1977 |
| JP | 52-31072 | 3/1977 |
| JP | 52-102412 | 8/1977 |
| JP | 55-50502 | 12/1980 |
| JP | 57-118569 | 7/1982 |
| JP | 1-186708 | 7/1989 |
| JP | 6-73267 | 3/1994 |
| JP | 8-41288 | 2/1996 |

OTHER PUBLICATIONS

Gächter et al, "Plastics Additives", 3$^{rd}$ edition, pp. 88-93 (1990).

*Primary Examiner*—Peter Szekely
(74) *Attorney, Agent, or Firm*—Nixon & Vanderhye, PC

(57) ABSTRACT

The polyacetal resin composition contains about 0.01–10 parts by weight of a glyoxyldiureide compound per 100 parts by weight of polyacetal resin. The glyoxyldiureide compound includes glyoxyldiureide and its derivatives (metal salts etc.). Optionally, about 0.01–10 parts by weight of a basic nitrogen-containing compound is further added. The basic nitrogen-containing compound includes melamine, melamine resin, and polyamide resin. Further, an antioxidant may be further added. The above composition contributes to stability, particularly heat stability, of polyacetal resin and suppression of emission of formaldehyde.

11 Claims, No Drawings

ND MOLDINGS

This application is a division of application Ser. No. 09/319,186, filed Jun. 2, 1999 (now U.S. Pat. No. 6,642, 289), which in turn was the US national phase of international application PCT/JP97/04758 filed 22 Dec. 1997 which designated the U.S., the entire contents of which are hereby incorporated by reference in this application.

TECHNICAL FIELD

The present invention relates to a polyacetal resin composition effectively inhibited against in-process and post-molding emission (or generation) of formaldehyde and featuring excellent moldability, to a method of producing the same, and to shaped articles as molded from the polyacetal resin composition.

BACKGROUND ART

Possessed of excellent mechanical properties, fatigue resistance, resistance to friction and wear, resistance to chemicals, and moldability, polyacetal resin has found application in a variety of fields such as automotive parts, electrical and electronic parts, other precision machine parts, architectural members and pipeline components, household and cosmetic parts, and medical device parts. However, with the increasing scope and diversification of uses, the resin is required to satisfy more and more sophisticated requirements. The necessary performance profile of polyacetal resin is that it does not experience reductions in mechanical strength during processing such as extrusion or other molding, does not stick to the die or mold (no mold deposits), retains its mechanical characteristics fully even upon prolonged heating (no heat aging), does not give rise to molding defects such as silver streaks and voids, and does not liberate formaldehyde after molding. One of the factors causing those phenomena is the degradation of the polymer on heating. Particularly because of its chemical structure, polyacetal resin is inherently unstable in an oxidative atmosphere at an elevated temperature or in an acidic or alkaline environment. Therefore, the essential need that must be fulfilled for polyacetal resin is that of insuring high thermal stability and minimal emission (or generation) of formaldehyde in the course of processing and from shaped articles. Formaldehyde is chemically active and ready to be oxidized to formic acid to thereby adversely affect the heat resistance of resin and, when the resin is used as electrical or electronic parts, cause corrosion of metallic contacts or their discoloration due to organic deposits, resulting in contact errors. Furthermore, formaldehyde as such contaminates the working environment for parts assembling and the ecology in the field of use of end products.

As means for stabilizing the chemically active end groups of the homopolymer, there is known a technique which comprises esterifying the polymer end groups by, for example, acetylation and, in the case of a copolymer, there is known a technology which comprises copolymerizing trioxane with a monomer having a neighboring carbon bond such as a cyclic ether or a cyclic formal in the stage of polymerization and then cleaving off the unstable end groups to generate inactive and stable end groups. However, the polymer suffers also from cleavage and decomposition of the main chain on heating and either of the above technologies alone is not effective enough to prevent this decomposition. Actually, therefore, it is considered essential to add an antioxidant and other stabilizers.

As a means for inhibiting emission of formaldehyde from polyacetal resin, it is known to add an antioxidant such as a hindered phenol or a hindered amine, as well as other stabilizers such as nitrogen-containing compounds, e.g. urea derivatives, guanidine derivatives, melamine derivatives, amidine derivatives, polyamides, polyacrylamide, etc., alkali metal hydroxides, alkaline earth metal hydroxides, organic or inorganic salts, and so on. Among the above-mentioned stabilizers, melamine derivatives are comparatively more effective. Moreover, antioxidants are generally used in combination with other stabilizers.

However, even with such additives, it is difficult to completely prevent decomposition of polyacetal resin or impart sufficiently high thermal stability to the resin to suppress emission of formaldehyde in any significant measure. Actually, the resin is subjected to the action of heat and oxygen within the extruder or other molding machine cylinder barrel in the course of melt-processing such as extrusion for the preparation of a composition or production of moldings. Therefore, formaldehyde is inevitably generated due to decomposition of the main chain or from the end groups which have not been sufficiently stabilized, so that the working environment for extrusion molding is adversely affected. Furthermore, on prolonged molding, fine particles and tarry matter adhere to the metal mold (mold deposits) to detract from working efficiency and affect the surface condition of moldings. Moreover, because of their tendency toward an increased risk for mold deposits and blooming (or bleeding), those additives cannot be incorporated in sufficiently large amounts. Furthermore, decomposition of the polymer results in reduced mechanical strength and causes discoloration. The above-mentioned technology is not sufficiently effective in inhibiting emission of formaldehyde from a polyacetal resin composition not only in the course of its processing but also from articles molded therefrom. Therefore, in the fields of motor vehicles, electrical and electronic devices, architectural members and pipeline components, household and cosmetic parts, and medical devices which are closely associated with human living and activity, the industry is required to further reduce the emission of formaldehyde from shaped articles which are end products. In view of the foregoing, a great deal of effort is being expended to find a more effective stabilizing formula for polyacetal resin.

Japanese Patent Publication No. 50502/1980 (JP-B-55-50502) and Japanese Patent Application Laid-open No. 73267/1994 (JP-A-6-73267) propose the use of super-macromolecular melamine derivatives available on melamine-formaldehyde polycondensation for enhanced heat stability and improvements in the risk for mold deposits and blooming. However, even with such a super-macromolecular melamine derivative, it is still difficult to achieve any remarkable inhibition of formaldehyde emission.

Japanese Patent Application Laid-open No. 88136/1973 (JP-A-48-88136) discloses a polyacetal composition containing a stabilizer comprised of a phenol compound and a nitrogen-containing compound such as hydantoin or its derivative for improved thermal stability and resistance to oxidation of polyacetal. However, even by adding such a hydantoin compound, it is still difficult to control the emission of formaldehyde from polyacetal resin at a sufficiently low level.

The present invention has for its object to provide a polyacetal resin composition adapted to insure improvements in the heat stability of polyacetal resin, particularly the melt-stability of the resin in molding, and to a process for its production.

It is another object of the invention to provide a polyacetal resin composition conducive to a marked inhibition of formaldehyde emission at a low level of addition and contributory to improvements in the living and working environments, a process for its production, and shaped articles as molded therefrom.

It is a further object of the invention to provide a polyacetal resin composition adapted to inhibit emission of formaldehyde even under severe conditions to suppress deposition of decomposition products on the mold and blooming or bleeding of such products from a shaped article and thermal aging or deterioration of the article, thus contributing to upgrading of the moldability and quality of the shaped articles, and a process for its production.

It is a still further object of the invention to provide shaped articles of polyacetal resin which have been remarkably inhibited against emission of formaldehyde.

A further object of the invention is to provide polyacetal resin moldings or articles suited for use in the fields of motor vehicles, electrical and electronic parts, architectural members and pipeline components, household and cosmetic products, and medical devices where the emission of formaldehyde is subject to rigorous regulatory control.

DISCLOSURE OF THE INVENTION

To accomplish the above objects, the inventors of the present invention evaluated a series of urea derivatives in connection with the stability (heat stability in particular) of polyacetal resin and found (1) that a glyoxyldiureide compound having a defined chemical structure is remarkably effective as a stabilizer (or a heat stabilizer) for polyacetal resin and particularly a stabilizer for use in molding and processing and (2) that the combined use of the glyoxyldiureide compound and a basic nitrogen-containing compound results in marked improvements in heat stability, particularly moldability, and assists in controlling the formaldehyde emission at a very low level even under severe conditions. The inventors have thence perfected the present invention.

The polyacetal resin composition of the present invention, thus, comprises a polyacetal resin and a glyoxyldiureide compound. The glyoxyldiureide compound includes glyoxyldiureide and metal salts of glyoxyldiureide. The proportion of the glyoxyldiureide compound may for example be about 0.01 to 10 parts by weight to each 100 parts by weight of the polyacetal resin. The polyacetal resin composition of the present invention may further contain a basic nitrogen-containing compound. The basic nitrogen-containing compound includes a variety of compounds such as melamine, melamine resin, polyamide resin, etc. The proportion of the basic nitrogen-containing compound may for example be about 0.01 to 10 parts by weight to each 100 parts by weight of the polyacetal resin. The above composition may further contain an antioxidant.

In the method of the invention, the polyacetal resin and glyoxyldiureide compound, optionally together with the basic nitrogen-containing compound, are admixed to provide a polyacetal resin composition having improved in-process stability.

Furthermore, the present invention encompasses shaped articles molded from the polyacetal resin composition.

The term "glyoxyldiureide compound" is used throughout this specification to mean not only glyoxyldiureide but also a derivative of glyoxyldiureide.

BEST MODE FOR CARRYING OUT THE INVENTION

The resin composition of the present invention comprises a polyacetal resin and a glyoxyldiureide compound. Optionally, the composition of the present invention contains a basic nitrogen-containing compound.

The polyacetal resin is a macromolecular compound containing oxymethylene group (—$CH_2O$—) as a predominant constituent unit and includes polyacetal homopolymers (e.g. Derlin™, manufactured by DuPont, U.S.A.; Tenac™ 4010, manufactured by Asahi Chemical Industry Co., Ltd.; etc.) and polyacetal copolymers comprising at least one other comonomer unit in addition to the oxymethylene unit (e.g. Duracon™, manufactured by Polyplastics Co., Ltd.). Referring to such copolymers, the comonomer unit includes oxyalkylene units of 2 to about 6 carbon atoms (preferably about $C_{2-4}$), for example, oxyethylene (—$CH_2CH_2O$—), oxypropylene, and oxytetramethylene units. The proportion of such comonomer unit may be small and can be selected from the range of about 0.01 to 20 mole %, preferably about 0.03 to 10 mole % (e.g. 0.05 to 5 mole %), more preferably about 0.1 to 5 mole %, relative to the whole polyacetal resin.

The polyacetal copolymer may for example be a two-component copolymer, a terpolymer and so on. The polyacetal copolymer may also be a random copolymer, a block copolymer, or a graft copolymer. Moreover, the polyacetal resin may be linear or branched, and may have a crosslinked structure. In addition, the end groups of the polyacetal resin may have been stabilized by esterification with a carboxylic acid such as acetic acid, propionic acid, or the like. There is no particular limitation on the degree of polymerization, the degree of branching, or the degree of crosslinking, only provided it can be melt-molded.

The polyacetal resin can be produced by polymerizing at least one member selected from an aldehyde (such as formaldehyde, paraformaldehyde) and trioxane, or by copolymerizing at least one member thus selected with a cyclic ether or cyclic formal such as ethylene oxide, propylene oxide, 1,3-dioxorane, or the like.

The present invention is characterized in the addition of a glyoxyldiureide compound, which is a specific urea derivative, for realizing a marked improvement in the in-process stability of polyacetal resin and, hence, a marked suppression of formaldehyde emission. The use of the glyoxyldiureide compound results in the expression of a stabilizing effect by far surpassing the effect of the conventional stabilizers, thus providing a polyacetal resin composition of excellent processability.

The glyoxyldiureide compound includes glyoxyldiureide (i.e. allantoin) and its derivatives. As regards glyoxyldiureide derivatives, reference can be made to the book entitled DICTIONARY OF ORGANIC COMPOUNDS, Vol. 1, p. 60 (1965, Eyre & Spottiswoode Publishers, Ltd.). The disclosures in this reference are incorporated herein by reference. The glyoxyldiureide derivative thus includes, for example, substituted glyoxyldiureide derivatives as substituted by a variety of substituent groups such as alkyl, cycloalkyl, and aryl groups (e.g. mono-, di-, or tri-$C_{1-4}$ alkyl-substituted compounds such as 1-methyl-, 3-methyl-, 3-ethyl, 5-methyl-, 1,3-dimethyl-, 1,6-dimethyl-, 1,8-dimethyl-, 3,8-dimethyl-, 1,3,6-trimethyl-, 1,3,8-trimethyl-, compounds and aryl-substituted compounds such as 5-phenyl derivatives), salts of glyoxyldiureide with metals [e.g. salts with alkali metals (Periodic Table of the Elements, Group 1A) such as Li, Na, K, etc.; salts with alkaline earth metals (Periodic Table, Group 2A) such as Mg, Ca, Sr, Ba, etc.; salts with Group 1B metals such as Cu and Ag; salts with Group 2B metals such as Zn; salts with Group 3B metals such as Al, Ga, and In; salts with Group 4B metals such as Sn and Pb; and salts with Group 8 metals such as Fe, Co, Ni, Pd, and Pt], reaction products of glyoxyldiureide with nitrogen-containing compounds (e.g. amino or imino group-containing compounds) [e.g. compounds with 2-pyrrolidone-5-carboxylates (salts, molecular compounds (complexes), or other forms), compounds with basic amino acids (arginine, lysine, ornithine, or other forms) (salts, molecular compounds (complexes), or other forms), compounds of glyoxyldiureide with imidazole compounds (salts, molecular compounds (complexes), or other forms)], and salts with organic acids.

For information on compounds of glyoxyldiureide with 2-pyrrolidone-5-carboxylates, Japanese Patent Application Laid-open No. 36453/1976 (JP-A-51-36453) can be consulted; as regards reaction products of glyoxyldiureide with basic amino acids, reference can be made to Japanese Patent Application Laid-open Nos. 102412/1977 (JP-A-52-102412), 25771/1977 (JP-A-52-2-5771), 25772/1977 (JP-A-52-25772), 31072/1977 (JP-A-52-31072), and 19771/1976 (JP-A-51-19771), among other literatures. For information on reaction products of glyoxyldiureide with imidazole compounds, reference may be made to Japanese Patent Application Laid-open No. 118569/1982 (JP-A-57-118569), for instance. There is no particular limitation on the stereochemical configuration of glyoxyldiureide or its derivative that can be used, but any of the d-form, l-form, and dl-form can be employed. Those species of glyoxyldiureide and derivatives thereof can be used independently or in combination.

The preferred glyoxyldiureide compound includes glyoxyldiureide, metal salts of glyoxyldiureide [alkali metal salts, alkaline earth metal salts, Group 1B metal salts, Group 2B metal salts, Group 3B metal salts, Group 4B metal salts, Group 8 metal salts, etc., particularly polyvalent (e.g. bi- through tetravalent, approx.) metal salts], and reaction products of glyoxyldiureide with amino or imino group-containing compounds. As specific metal salts of glyoxyldiureide, there can be mentioned aluminum dihydroxy allantoinate and aluminum chlorohydroxy allantoinate (manufactured by Kawaken Fine Chemicals Co., Ltd.), to mention just a few examples. The reaction product with an amino or imino group-containing compound includes but is not limited to allantoin sodium dl-pyrrolidonecarboxylate (manufactured by Kawaken Fine Chemicals Co., Ltd.).

The level of addition of the glyoxyldiureide compound, based on 100 parts by weight of polyacetal resin, may for example be about 0.01 to 10 parts by weight (e.g. 0.01 to 5 parts), preferably about 0.03 to 5 parts by weight, and more preferably about 0.05 to 2.5 parts by weight (especially 0.05 to 2 parts), and the emission of formaldehyde can be well controlled even at the addition level of about 0.05 to 1.5 parts by weight (e.g. 0.1 to 1.5 parts). If the proportion of the glyoxyldiureide compound is smaller than 0.01 part by weight, it will be difficult to effectively suppress the emission of formaldehyde. Conversely when the proportion exceeds 10 parts by weight, both moldability and the color tone of products will be adversely affected and, in addition, the tendency toward bleeding will be increased.

The glyoxyldiureide compound alone is capable of stabilizing polyacetal resin in a remarkable measure but when it is used in combination with a basic nitrogen-containing compound, the generation of formaldehyde is more successfully inhibited. Thus, by adding the glyoxyldiureide compound, which is a species of urea derivative, and a basic nitrogen-containing compound in combination, it is possible to minimize the emission of formaldehyde even under severe conditions and improve the heat stability and in-process stability of polyacetal resin each in a considerable measure. This combination of the glyoxyldiureide compound and the basic nitrogen-containing compound leads to expression of an extremely high level of stability which can never be expected from conventional stabilizers, thus providing a polyacetal resin composition superb in processability.

The basic nitrogen-containing compound mentioned above may be a compound of low molecular weight or a compound of high molecular weight (nitrogen-containing resin). The nitrogen-containing compound of low molecular weight includes, for example, aliphatic amines such as monoethanolamine, diethanolamine, etc., aromatic amines (e.g. aromatic secondary or tertiary amines such as o-toluidine, p-toluidine, p-phenylenediamine, etc.), amide compounds (polycarboxylic acid amides, e.g. malonamide, isophthaldiamide, etc., p-aminobenzamide, etc.), hydrazine and its derivatives (e.g. hydrazines, hydrazones, and hydrazides such as polycarboxylic acid hydrazides, etc.), guanidine and its derivatives (e.g. 3,5-diamino-1,2,4-triazole, amidine, dicyandiamide, and their derivatives), urea compounds (e.g. urea, ethyleneurea, thiourea, and their derivatives), polyaminotriazines (e.g. guanamines such as guanamine, acetoguanamine, benzoguanamine, etc. and their derivatives, melamine and its derivatives), uracil and its derivatives (e.g. uracil, uridine, etc.), and cytosine and its derivatives (e.g. cytosine, cytidine, etc.).

The nitrogen-containing resin includes, for example, amino resins available on reaction of amino-containing monomers with formaldehyde (condensation resins such as urea resin, thiourea resin, guanamine resin, melamine resin, guanidine resin, etc. and co-condensation resins such as urea-melamine resin, urea benzoguanamine resin, phenol-melamine resin, benzoguanamine-melamine resin, aromatic polyamine-melamine resin, etc.), aromatic amine-formaldehyde resin (aniline resin etc.), polyamide resin (e.g. homo- or copolymerized polyamides such as nylon 3, nylon 6, nylon 66, nylon 11, nylon 12, nylon MXD6, nylon 4-6, nylon 6-10, nylon 6-11, nylon 6-12, nylon 6-66-610, etc., substituted polyamides containing methylol or alkoxymethyl groups, etc.), polyesteramides, polyamideimides, polyacrylamide, and polyaminothioether.

Those nitrogen-containing compounds can be used independently or in a combination of two or more species.

The preferred nitrogen-containing compound includes ureas (urea and its derivatives), polyaminotriazines (melamine and its derivatives), and nitrogen-containing resins (amino resins such as urea resin, melamine resin, etc., polyamide resins, etc.). Particularly preferred are melamine, amino resins (melamine resin etc.), and polyamide resins. The more preferred are amino resins and, in particular, crosslinked amino resins. Moreover, melamine resin (melamine-formaldehyde resin) and, in particular, crosslinked melamine resin are preferred. The crosslinked amino resin and particularly crosslinked melamine resin are generally insoluble in warm water at 40 to 100° C. (particularly 50 to 80° C.).

Melamine resin can be obtained by reacting at least melamine, optionally together with co-condensable monomers (e.g. phenol compounds, urea, thiourea, guanamines, etc.), with formaldehyde. The melamine resin may be a precondensate of melamine with formaldehyde. It may also be a methylol melamine resin containing methylol groups or an alkoxymethyl melamine resin available upon etherification of at least some of the available methylol groups with an alcohol (e.g. methanol, ethanol, propanol, isopropyl alcohol, butanol, etc.).

The melamine resin may be a water-soluble melamine resin but is preferably a water-insoluble melamine resin. The melamine resin usually have at least one remaining amino or imino group per melamine nucleus.

The particularly preferred melamine resin includes crosslinked melamine resins having a high degree of condensation and containing a plurality of free amino or imino groups per melamine nucleus, for example (1) a melamine resin which is insoluble in warm water but soluble in dimethyl sulfoxide (a melamine-formaldehyde condensate) and (2) a melamine resin which is insoluble in warm water and dimethyl sulfoxide (crosslinked melamine-formaldehyde condensate). As analyzed by $^1$H-NMR, the melamine resin (1) is such that the average number of melamine units (average degree of polymerization or condensation) per mole of melamine-formaldehyde condensate is about 2 to 10 (preferably 2 to 5 and more preferably 2.2 to 3.8) and the average number of hydrogen atoms bound to 3 amino groups in the melamine unit (average NH number) is not less than 3 (preferably 3.5 or more).

The melamine resin (1) is disclosed in Japanese Patent Application Laid-open No. 73267/1994 (JP-A-6-73267) and can be produced by reacting about 0.8 to 10 moles (preferably 0.8 to 5 moles, more preferably 1 to 3 moles, and particularly 1 to 2 moles) of formaldehyde with each mole of melamine in aqueous solution or aqueous dispersion. Thus, for example, a mixture of melamine with an aqueous solution of formaldehyde is reacted at pH about 8 to 9 and a temperature of about 50 to 90° C. and as the solution develops turbidity with progress of condensation reaction, the condensation reaction is stopped by, for example, cooling at a suitable stage. This reaction mixture is dried by a spray-drying or other method to provide a particulate crude melamine-formaldehyde condensate. This particulate crude melamine-formaldehyde condensate is washed with warm water (about 50 to 70° C.) for a suitable time (e.g. 10 min. to 3 hrs., preferably about 30 min. to 1 hr.) and filtered. The residue is dissolved in dimethyl sulfoxide. This dimethyl sulfoxide solution is filtered to remove the insoluble matter and the filtrate is poured in a large excess of acetone. The precipitate is recovered by filtration and dried to provide a purified melamine-formaldehyde polycondensate as white powders.

The above-mentioned melamine resin (2) is disclosed in Japanese Patent Publication No. 50502/1980 (JP-B-55-50502) and can be provided by a process which comprises reacting about 0.8 to 10 moles (preferably 1 to 5 moles, more preferably 1 to 3 moles, particularly 1 to 2 moles) of formaldehyde with each mole of melamine in aqueous solution or dispersion in the alkaline region of pH in the same manner as above to prepare a precondensate (soluble condensate) and, then, causing the precondensate to undergo further condensation (crosslinking) with stirring under acidic conditions, namely pH about 5 to 6.9, at a temperature of about 70 to 100° C. The melamine resin (2) can be finally purified and isolated by washing the particulate melamine resin obtained as above with warm water, mixing the filtration residue with dimethyl sulfoxide, washing the dimethyl sulfoxide-insoluble fraction with a solvent such as acetone, and drying the precipitate.

The basic nitrogen-containing compound is generally used in the particulate form.

The proportion of the basic nitrogen-containing compound can be judiciously selected according to the amount of the glyoxyldiureide compound, among other factors and, based on 100 parts by weight of polyacetal resin, may for example be about 0.01 to 10 parts by weight (e.g. 0.01 to 5 parts), preferably about 0.03 to 5 parts by weight, and more preferably about 0.05 to 2.5 parts by weight (particularly 0.1 to 1 part), and the generation of formaldehyde can be definitely suppressed even at the formulation level of about 0.1 to 0.5 part by weight.

The ratio of the glyoxyldiureide compound to the basic nitrogen-containing compound can be selected from within a broad range, namely the range of generally 5/95–95/5 (w/w), preferably 10/90–90/10 (w/w), and more preferably 20/80–80/20 (w/w). Particularly when the proportion of the glyoxyldiureide compound is large, a marked improvement is obtained in the control of formaldehyde emission. Therefore, the preferred ratio (former/latter, w/w) is about 0.5 to 10, preferably about 0.7 to 8, and more preferably about 1 to 5.

The total amount of the glyoxyldiureide compound and basic nitrogen-containing compound can be generally selected from within the range of 0.02 to 10 parts by weight to 100 parts by weight of polyacetal resin, and is about 0.02 to 5 parts by weight (e.g. 0.1 to 5 parts), preferably about 0.05 to 3 parts by weight (e.g. 0.2 to 3 parts), more preferably about 0.1 to 2 parts by weight, and particularly about 0.1 to 1.5 parts by weight (e.g. 0.3 to 1.5 parts) relative to 100 parts by weight of polyacetal resin.

The stabilizer comprising the glyoxyldiureide compound, optionally in combination with the basic nitrogen-containing compound, imparts remarkable stability to polyacetal resin even at a low level of addition but can be used in further combination with an antioxidant.

The antioxidant mentioned just above includes, for example, the antioxidants in the phenol series (e.g. hindered phenols), amine series, phosphorus series, sulfur series, hydroquinone series, and quinoline series.

The phenol series antioxidant includes hindered phenols such as 2,2'-methylenebis(4-methyl-6-t-butyl-phenyl), 4,4'-methylenebis(2,6-di-t-butylphenol), 4,4'-butylidenebis(3-methyl-6-t-butylphenol), 2,6-di-t-butyl-p-cresol, 1,3,5-trimethyl-2,4,6-tris(3,5-di-t-butyl-4-hydroxybenzyl)benzene, 1,6-hexanediol bis[3-(3,5-di-t-butyl-4-hydroxyphenyl)propionate], pentaerythritol tetrakis[3-(3,5-di-t-butyl-4-hydroxyphenyl)propionate], triethylene glycol bis[3-(3-t-butyl-5-methyl-4-hydroxyphenyl)propionate], n-octadecyl-3-(4',5'-di-t-butylphenol)propionate, n-octadecyl-3-(4'-hydroxy-3', 5'-di-t-butylphenol) propionate, stearyl-2-(3,5-di-t-butyl-4-hydroxyphenol) propionate, distearyl 3,5-di-t-butyl-4-hydroxybenzyl phosphonate, 2-t-butyl-6-(3-t-butyl-5-methyl-2-hydroxybenzyl)-4-methylphenyl acrylate, N,N'-hexamethylenebis(3,5-di-t-butyl-4-hydroxy-hydro-cinnamamide, 3,9-bis{2-[3-(3-t-butyl-4-hydroxy-5-methylphenyl) propionyloxy]-1,1-dimethylethyl}-2,4,8,10-tetraoxaspiro[5, 5]undecane, 4,4'-thiobis(3-methyl-6-t-butylphenol), and 1,1, 3-tris(2-methyl-4-hydroxy-5-t-butylphenol)butane, among others.

The antioxidant in the amine series includes hindered amines such as 4-methoxy-2,2,6,6-tetramethyl-piperidine, 4-benzoyloxy-2,2,6,6-tetramethylpiperidine, 4-phenoxy-2, 2,6,6-tetramethylpiperidine, bis-(2,2,6,6-tetramethyl-4-piperidyl)oxalate, bis-(2,2,6,6-tetramethyl-4-piperidyl)malonate, bis-(2,2,6,6-tetramethyl-4-piperidyl)adipate, bis-(2,2, 6,6-tetramethyl-4-piperidyl)sebacate, bis-(1,2,2,6,6-pentamethyl-4-piperidyl)sebacate, bis(2,2,6,6-tetramethyl-4-piperidyl)terephthalate, 1,2-bis(2,2,6,6-tetramethyl-4-piperidyloxy)ethane, phenyl-1-naphthylamine, phenyl-2- naphthylamine, N,N'-diphenyl-1,4-phenylenediamine, and N-phenyl-N'-cyclohexyl-1,4-phenylenediamine, among others.

The antioxidant in the phosphorus series includes, for example, triisodecyl phosphite, triphenyl phosphite, tris (nonylphenyl) phosphite, diphenyl isodecyl phosphite, phenyl diisodecyl phosphite, 2,2-methylenebis(4,6-di-t-butylphenyl) octyl phosphite, 4,4'-butylidenebis(3-methyl-6-t-butylphenyl)ditridecyl phosphite, tris(2,4-di-t-butylphenyl) phosphate, tris(2-t-butyl-4-methylphenyl) phosphate, tris(2,4-di-t-amylphenyl)phosphate, tris(2-t-butylphenyl) phosphate, bis(2-t-butylphenyl)phenyl phosphate, tris[2-(1,1-dimethylpropyl)phenyl]phosphate, tris[2,4-di(1,1-dimethylpropyl)phenyl]phosphite, tris(2-cyclohexylphenyl)phosphate, and tris(2-t-butyl-4-phenylphenyl) phosphite.

The antioxidant in the hydroquinone series includes, for example, 2,5-di-t-butylhydroquinone; the antioxidant in the quinoline series includes, for example, 6-ethoxy-2,2,4-trimethyl-1,2-dihydroquinoline; and the antioxidant in the sulfur series includes but is not limited to dilauryl thiodipropionate and distearyl thiodipropionate.

Those antioxidants can be used independently or in a combination of two or more species. The preferred antioxidant includes phenol series antioxidants (particularly hindered phenols). Preferred among the hindered phenols are $C_{2-10}$ alkylenediol bis[3-(3,5-di-branched $C_{3-6}$ alkyl-4-hydroxyphenyl)propionate] such as 1,6-hexanediol bis[3-(3,5-di-t-butyl-4-hydroxyphenyl)-propionate; di- or trioxy$C_{2-4}$alkylenediol bis[3-(3,5-di-branched $C_{3-6}$ alkyl-4-hydroxyphenyl)propionate] such as triethylene glycol bis[3-(3-t-butyl-5-methyl-4-hydroxyphenyl)propionate; $C_{3-8}$ alkylenetriol bis[3-(3,5-di-branched $C_{3-6}$ alkyl-4-hydroxyphenyl)propionate] such as glycerin tris[3-(3,5-di-t-butyl-4-hydroxyphenyl)propionate]; and $C_{4-8}$ alkylenetetraol tetrakis[3-(3,5-di-branched $C_{3-6}$ alkyl-4-hydroxyphenyl) propionate] such as pentaerythritol tetrakis [3-(3,5-di-t-butyl-4-hydroxyphenyl)propionate].

Those antioxidants can be used independently or in a combination of two or more species. The proportion of the antioxidant, based on 100 parts by weight of polyacetal resin, may for example be selected from the range of about 0.01 to 5 parts by weight, preferably about 0.05 to 2.5 parts by weight, and particularly about 0.1 to 1 part by weight.

Moreover, the ratio (by weight) of the glyoxyldiureide compound to the antioxidant may for example be selected from such a range that the former/the latter is about 0.1 to 10, preferably about 0.2 to 10, and more preferably about 0.5 to 7 (particularly 1 to 7). Particularly when the proportion of the glyoxyldiureide compound is large, a marked improvement is obtained in the control of formaldehyde emission. Therefore, the preferred ratio (by weight) of the former/the latter is about 0.5 to 10, particularly about 1.0 to 10, more preferably about 1.2 to 10, most preferably about 1.5 to 5, and particularly about 1.7 to 5 (e.g. 2 to 5).

The total amount of the glyoxyldiureide compound and antioxidant as used in such a ratio can be generally selected from the range of about 0.1 to 10 parts by weight for each 100 parts by weight of polyacetal resin, and is preferably about 0.1 to 5 parts by weight, more preferably about 0.1 to 3 parts by weight (e.g. about 0.2 to 3 parts), and still more preferably about 0.1 to 2 parts by weight (particularly about 0.1 to 1.5 parts (e.g. about 0.5 to 1.5 parts)) relative to 100 parts by weight of polyacetal resin.

The above-mentioned antioxidant and basic nitrogen-containing compound can be used in combination.

The resin composition of the present invention may be supplemented with other stabilizers such as alkali metal hydroxides, alkaline earth metal hydroxides, metal oxides, salts of organic carboxylic acids, long-chain fatty acids or their salts, and fatty acid esters of polyhydric alcohols, among others.

Where necessary, the resin composition of the present invention may be further supplemented with any of a variety of additives such as coloring agents inclusive of dyes and pigments, parting agents or mold-releasing agents, nucleating agents, antistatics, flame retardants, surfactants, various polymers, and fillers selectively, each independently, or in a combination of two or more species.

The polyacetal resin composition of the present invention may be provided as a particulate composition or a fused composition (pellets etc.). The resin composition can be produced by mixing the polyacetal resin and glyoxyldiureide compound, optionally together with additives, in the conventional manner. It is also possible to add at least one component selected from basic nitrogen-containing compounds and antioxidants mentioned hereinbefore. The molding of such a polyacetal resin composition can be carried out typically by (1) a method which comprises kneading and extruding a mixture of component materials with a single-screw or twin-screw extruder to prepare pellets and molding those pellets, (2) a method which comprises preparing pellets of different compositions (master batches), mixing the pellets in predetermined amounts (dilution) and molding them to provide an article of a specified composition, or (3) a method which comprises depositing the glyoxyldiureide compound or basic nitrogen-containing compound on pellets of polyacetal resin by dusting, for instance, and molding the whole to provide an article of a prescribed composition. In preparing a composition for molding, it is advantageous for improved dispersibility of additives to mix the basal particulate polyacetal resin (e.g. a powder available on crushing a portion or the whole of polyacetal resin) with other components (e.g. the glyoxyldiureide compound, basic nitrogen-containing compound, and so on) and melt-knead the mixture.

The resin composition of the present invention contributes to an improved working environment because, in the molding process (particularly the melt-molding process), the emission of formaldehyde due to the oxidation or pyrolysis of polyacetal resin is remarkably inhibited. Moreover, the composition is contributory to a significant suppression of deposition of decomposition products on the metal die or mold (mold deposits), blooming or bleeding of decomposition products on the shaped article, and thermal degradation of the article such as heat aging, and insures freedom from various problems associated with molding. Therefore, the resin composition of the present invention is of great use for the manufacture of a variety of shaped articles by such techniques as injection molding, extrusion molding, compression molding, blow molding, vacuum molding, expansion molding or foaming, and rotational molding.

The shaped or molded article of polyacetal resin according to the present invention as molded from the polyacetal resin composition contains at least the glyoxyldiureide compound and, as such, liberates only a minimal amount of formaldehyde. In other words, shaped articles molded from the conventional polyacetal resins containing antioxidants and other stabilizers liberate relatively large amounts of formaldehyde, cause corrosion and discoloration, and contaminate the working environment. For example, the formaldehyde emission of commercial ordinary polyacetal resin articles is about 2 to 5 µg (usually 2 µg) per $cm^2$ surface area under dry conditions (in a constant-temperature dry atmosphere) and about 3 to 6 µg per cm² surface area under humid conditions (in a constant-temperature moisture-laden atmosphere). Moreover, even under controlled molding conditions, it is difficult to manufacture a shaped article liberating less than 1.5 µg/cm² of formaldehyde under dry conditions or less than 2.5 µg/cm² under humid conditions.

In contrast, the formaldehyde emission of the shaped polyacetal resin article according to the invention is not greater than 1.5 µg (0 to about 1.5 µg), preferably not greater than 1.2 µg (0 to about 1.2 µg), more preferably not greater than 1 µg (0 to about 1 µg), and most preferably about 0.01 to 1 µg per cm² surface area of the article under dry conditions. Similarly, its formaldehyde emission per cm² under humid conditions is not greater than 2.5 µg (0 to about 2.5 µg), preferably not greater than 2 µg (0 to about 2 µg), more preferably not greater than 1.5 µg (0 to about 1.5 µg), and most preferably about 0.01 to 1.2 µg (for example, about 0.01 to 1 µg).

The shaped polyacetal resin article according to the present invention should show the above-mentioned formaldehyde emission under either dry conditions or humid conditions, but it generally does show the above emission level under both conditions.

The formaldehyde emission under dry conditions can be determined as follows.

After the shaped article of polyacetal resin is cut and its surface area measured where necessary, a suitable portion of the article (e.g. the amount equivalent to a surface area of about 10 to 50 cm²) is placed in a hermetically closed vessel (20 ml capacity) and allowed to stand at a temperature of 80° C. for 24 hours. Then, this closed vessel is charged with 5 ml of water and the formalin in the aqueous solution is assayed in accordance with JIS K0102, 29 (under the heading of Formaldehyde) to calculate the formaldehyde emission (µg/cm²) per unit surface area of the shaped article.

The formaldehyde emission under humid conditions can be determined as follows.

After the shaped article of polyacetal resin is cut and its surface area measured where necessary, a suitable portion of the shaped article (e.g. the amount equivalent to a surface area of about 10 to 100 cm²) is suspended from the lid of a closable vessel (1 L capacity) containing 50 ml of distilled water. After closure of the vessel, the vessel is allowed to stand in an incubator at a temperature of 60° C. for 3 hours. Thereafter, the vessel is allowed to stand at room temperature for 1 hour and the formalin in the aqueous solution within the vessel is assayed in accordance with JIS K0102, 29 (under the heading of Formaldehyde) to calculate the formaldehyde emission per unit surface area (µg/cm²) of the article.

The above quantitative limitation on formaldehyde emission in the present invention is valid not only for shaped articles available from polyacetal resin compositions comprising at least the polyacetal resin and glyoxyldiureide compound, with or without the conventional additives (conventional stabilizer, parting agent, etc.), but also for shaped articles molded from comparable resin compositions containing an inorganic filler and/or other polymers, only if a major part of the surface of the article (for example, 50 to 100% of the total surface area) is constituted by polyacetal resin (for example, a multi-colored article or a coated article) and the article at least comprises the polyacetal resin and glyoxyldiureide compound.

INDUSTRIAL APPLICABILITY

The polyacetal resin composition of the present invention contains at least a glyoxyldiureide compound and, as such, features marked improvements in the stability and thermal stability (particularly melt-stability during processing) of the polyacetal resin. Furthermore, even at a low level of addition, the glyoxyldiureide remarkably suppresses emission of formaldehyde and, hence, formaldehyde odor from shaped or molded articles, thus leading to a marked improvement in the working environment. In particular, the stability of polyacetal resin can be improved and the formaldehyde emission drastically reduced. The polyacetal resin composition of the present invention is not only inhibited against emission of formaldehyde even under severe conditions but substantially eliminates the problem of deposition of decomposition products on the metal die or mold (mold deposits), blooming or bleeding of decomposition products on shaped articles, and thermal degradation of the articles, thus contributing to the quality of shaped articles as well as moldability.

The shaped article according to the present invention finds application in any field of use where formaldehyde is objectionable (for example, knobs and levers for use as automotive parts) and can also be used advantageously as parts and members in a variety of fields inclusive of automotive parts, electrical and electronic component (driving component and driven component) parts, artitectural members and pipeline installation parts, household and cosmetic product parts, and medical device (for diagnostic or therapeutic use) parts.

Specifically, the automotive parts include but are not limited to car interior parts such as the inner handle, fuel trunk opener, seat belt buckle, assist lap, switch, knob, lever, clip, etc., electrical system parts such as meters and connectors, electrical and electronic parts or mountings related to audio equipment and car navigation equipment, parts in contact with metals, typically the window regulator carrier plate, door lock actuator parts, mirror parts, wiper motor system parts, and fuel system parts.

The mechanical parts in the electrical or electronic field includes, for example, parts or members constituted with polyacetal resin articles and fitted with a number of metal contacts [e.g. audio equipment such as the cassette tape recorder, video equipment such as the video tape recorder (VTR), 8 mm or other video camera, etc., office automation equipment (OAE) such as the copying machine, facsimile, word processor, computer, etc., toys actuated by the driving force of an electric motor or a spring, the telephone receiver, the keyboard as an accessory to a computer or the like]. To be specific, there can be mentioned the chassis, gear, lever, cam, pulley, and bearing. Furthermore, the invention is applicable to optical and magnetic recording medium parts at least partly made of molded polyacetal resin (e.g. metal film magnetic tape cassette, magnetic disk cartridge, opticomagnetic disc cartridge, etc.) and more particularly, the metal tape cassette for musics, digital audio tape cassette, 8 mm video tape cassette, floppy disk cartridge, minidisk cartridge, etc. As specific optical and magnetic medium parts, there can be mentioned tape cassette parts (tape cassette body, reel, hub, guide, roller, stopper, lid, etc.) and disk cartridge parts (disk cartridge body (case), shutter, cramping plate, etc.).

In addition, the shaped article of polyacetal resin according to the invention can be used with advantage in a broad range of products related to daily living, cosmetic products, and medical devices, for example architectural members and pipeline parts such as lighting equipment parts, interior architectural members, piping, cock, faucet, toilet-related parts, etc., stationery, lipcream or lipstick cases, cleansing device, water cleaner, spray nozzle, spray device or container, aerosol container, general vessels, syringe holder, and so on.

EXAMPLES

The following examples are intended to illustrate the present invention in further detail and should by no means be construed as defining the scope of the invention.

The polyacetal resin, glyoxyldiureide compound, basic nitrogen-containing compound, antioxidant, and other stabilizers used in the working examples and comparative examples are as follows.

1. Polyacetal Resin
(a-1): copolymer polyacetal resin
  ("Duracon™," manufactured by Polyplastics Co., Ltd.)
(a-2): homopolymer polyacetal resin
  ("Tenac™ 4010," manufactured by Asahi Chemical Industry Co., Ltd.)
2. Glyoxyldiureide Compound
(b-1): glyoxyldiureide
(b-2): aluminum dihydroxy allantoinate
  (manufactured by Kawaken Fine Chemicals Co., Ltd.)
3. Basic nitrogen-containing compound
(c-1)-(c-5): melamine-formaldehyde resins
  (c-1): Using 1 mole of formaldehyde per mole of melamine, the reaction was carried out in water at pH 8.5 and 75° C. After the reaction system had developed white turbidity, the reaction mixture was allowed to stand for a while and, then, cooled to stop the reaction. The reaction product was dried to provide a particulate crude melamine resin. This particulate resin was washed with warm water at 60° C. for 30 minutes and filtered. The residue was washed with acetone and dried at room temperature. This product was dissolved in dimethyl sulfoxide at a concentration of 0.5 weight % over 2 hours and the insoluble matter was filtered off. The filtrate was poured in 20 times its weight of acetone and the precipitate was collected by filtration and dried at room temperature to provide a white purified melamine resin powder. As determined by $^1$H-NMR, the mean degree of condensation, mean NH number, and monomer content of this melamine resin were 2.51, 4.26, and 4.1 weight %, respectively.
  (c-2): Except that 2.0 moles of formaldehyde was used per mole of melamine, the above procedure for (c-1) was otherwise repeated to provide a white purified melamine resin powder (mean degree of condensation 2.71, mean NH number 3.62, monomer content 3.5 weight %).
  (c-3): Using 1.1 moles of formaldehyde per mole of melamine, the reaction was carried out in water at pH 8.0 and 70° C. for a time short of producing white turbidity to prepare a melamine-formaldehyde prepolymer which is soluble in water. Then, the reaction system was adjusted to pH 6.5 under constant stirring and the stirring was further continued to produce a melamine resin as a precipitate. This precipitate was dried to provide a particulate crude melamine resin. The particle was washed with warm water at 60° C. for 30 minutes and filtered, and the residue was washed with acetone and dried at room temperature. The dried resin was dispersed in dimethyl sulfoxide at a concentration of 0.5 weight % over 2 hours and then filtered to remove the soluble matter. The residue was washed with acetone and dried at room temperature to provide a white purified melamine resin powder (because of insolubility and infusibility, its mean degree of condensation and mean NH number were undeterminable; monomer content 0.05 weight %).
  (c-4): Except that 1.2 moles of formaldehyde was used for each mole of melamine, the above procedure for (c-3) was otherwise repeated to provide a particulate crude melamine resin. This particle was washed with warm water at 60° C. for 30 minutes and filtered. The residue was washed with acetone and then dried at room temperature to provide a white purified melamine resin powder (because of insolubility and infusibility, its mean degree of condensation and mean NH number were undeterminable; monomer content 0.03 weight %).
  (c-5): Except that 2.0 moles of formaldehyde was used for each mole of melamine, the above procedure for (c-4) was otherwise repeated to provide a white purified melamine resin powder (because of insolubility and infusibility, its mean degree of condensation and mean NH number were undeterminable; monomer content 0.01 weight %).
(c-6): melamine
(c-7): nylon 6
(c-8): nylon 6-66-610
4. Antioxidant
(d-1): pentaerythritol tetrakis[3-(3,5-di-t-butyl-4-hydroxyphenyl)propionate]
5. Other stabilizers
(e-1): ethyleneurea
(e-2): melamine
(e-3): hydantoin
(e-4): nylon 12
(e-5): cyanoguanidine
(e-6): 5,5-dimethylhydantoin Referring to the working examples and comparative examples, the amount of emission of formaldehyde from the molten resin, the amount of emission of formaldehyde from the molded article under dry and humid conditions, moldability, odor in the molding environment, odor from the molded article, and heat aging quality were evaluated by the following methods.

[The amount of generation of formaldehyde from molten resin]

A 5 g-equivalent of pellets was accurately weighed and maintained in a metallic container at 200° C. for 5 minutes. Then, the internal atmosphere of the container was allowed to be absorbed in distilled water. The formaldehyde content of the resulting aqueous solution was determined in accordance with JIS K0102, 29 (under the heading of Formaldehyde) and the formaldehyde gas generation (ppm) from the pellets was calculated.

[The amount of emission of formaldehyde from the molded article in a dry environment]

Each resin sample consisting of 10 testpieces (2 mm×2 mm×50 mm; total surface area about 40 cm$^2$) was placed in a closed container (capacity 20 ml) and heated in a constant temperature oven at 80° C. for 24 hours. After air-cooling to room temperature, 5 ml of distilled water was injected into the container using a syringe. The formalin content of this aqueous solution was determined in accordance with JIS K0102, 29 (under the heading of Formaldehyde) and the formaldehyde gas emission (µg) per cm$^2$ surface area was calculated.

[The Amount of Emission of Formaldehyde from the Molded Article in a Humid Environment]

A testpiece (100 mm×40 mm×2 mm; total surface area 85.6 cm$^2$) was suspended from the stopper or lid of a polyethylene bottle (capacity 1 L) containing 50 ml of distilled water. The bottle was stoppered or closed, and allowed to stand in a constant temperature oven at 60° C. for 3 hours, followed by one hour of standing at room temperature. The formalin content of the aqueous solution in the bottle was determined in accordance with JIS K0102, 29 (under the heading of Formaldehyde) and the formaldehyde gas emission (μg) per $cm^2$ surface area of the article was calculated.

[Moldability (Quantitative Evaluation of Mold Deposits) and Odor in Molding Environment]

Using pellets of each test polyacetal resin composition and an injection molding machine, a molded article was continuously manufactured (24 hours) under the following conditions and the formaldehyde odor around the injection machine during continuous operation and the amount of mold deposits after 24 hours of operation were evaluated by the following methods.

(Molding Conditions)
Injection machine: Toshiba IS30 EPN [Manufactured by Toshiba Machine Co., Ltd.]
Cylinder temperature: 200° C.
Injection pressure: 750 kg/$cm^2$
Injection time: 4 seconds
Cooling time: 3 seconds
Mold temperature: 30° C.
(Evaluation of formaldehyde odor around the injection machine during continuous operation)
A: Substantially no odor
B: Slight formaldehyde odor
C: Moderate formaldehyde odor, inducing irritable responses of the throat and eye
D: Intense formaldehyde odor, prohibiting attendance
(Evaluation of metal deposits in continuous molding)
A: A slight amount of deposits
B: A small amount of deposits
C: A large amount of deposits; not extensive enough to cover up the whole surface of the mold
D: A large amount of deposits, covering the whole surface of the mold

[Formaldehyde Odor of Molded Articles]

The formaldehyde odor was evaluated as follows. Each resin sample comprising 20 testpieces (2 mm×2 mm× 50 mm each; total surface area about 80 $cm^2$) was placed in a sealed container (capacity 200 ml) and heated in a constant temperature oven at 40° C. for 1 hour. The container was then opened and the odor was immediately evaluated.

In addition, for evaluating the formaldehyde odor at a higher temperature, each resin sample comprising 10 testpieces (2 mm×2 mm×50 mm each; total surface area about 40 $cm^2$) was placed in a closed container (capacity 20 ml) and heated in an incubator at a temperature of 80° C. for 24 hours. The container was then opened and the odor was immediately evaluated.

The formaldehyde odor was organoleptically evaluated according to the following five-grade schedule.
A: no odor
B: slight odor
C: moderate odor
D: intense odor
E: severe odor

[Heat Aging Quality (Bloom on the Molded Article)]

The molded article was allowed to stand at 70° C. and 80% RH for 3 days and further at 120° C. overnight. The surface of the article was then inspected by the unaided eye for the degree of blooming and evaluated according to the following 4-grade schedule.
A: No blooming at all
B: Bloom found locally
C: Thin bloom all over
D: Copious bloom all over

[Heat Aging Quality (Evaluation of Surface Cracking of the Molded Article)]

The flat molded testpiece (120 mm×120 mm×2 mm) was heat-aged in a geer oven at 140° C. for 30 days and the surface of the testpiece was inspected by the unaided eye for the degree of cracking and evaluated according to the following 3-grade schedule.
A: No crack at all
B: Cracks found locally
C: Cracks all over Examples 1–7 and Comparative Examples 1–7

Polyacetal resin was mixed with an antioxidant and the glyoxyldiureide compound in the proportions indicated in Table 1 and the mixtures were respectively melt-extruded using a twin-screw extruder to prepare pelletized compositions. From the pellets, testpieces were fabricated with an injection molding machine. The pellets and testpieces were evaluated for the emission of formaldehyde from the molten resin, formaldehyde odor during continuous molding, moldability, and heat aging quality (blooming). The results are shown in Table 1.

For comparison, samples prepared without addition of the glyoxyldiureide compound and with or without addition of the conventional stabilizers were similarly evaluated.

TABLE 1

|  | EXAMPLES |  |  |  |  |  |  | COMPARATIVE EXAMPLES |  |  |  |  |  |  |
| --- | --- | --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 | 6 | 7 |
| Polyacetal resin | a-1 | a-1 | a-1 | a-1 | a-1 | a-1 | a-2 | a-1 | a-1 | a-1 | a-1 | a-1 | a-1 | a-2 |
| (parts by weight) | 100 | 100 | 100 | 100 | 100 | 100 | 100 | 100 | 100 | 100 | 100 | 100 | 100 | 100 |
| Glyoxyldiureide compound | b-1 | b-1 | b-1 | b-1 | b-2 | b-2 | b-2 | — | — | — | — | — | — | — |
| (parts by weight) | 0.5 | 0.3 | 0.5 | 1.0 | 0.3 | 1.0 | 0.2 |  |  |  |  |  |  |  |
| Antioxidant | — | d-1 | d-1 | d-1 | d-1 | d-1 | — | d-1 | d-1 | d-1 | d-1 | d-1 | — | — |
| (parts by weight) |  | 0.5 | 0.5 | 0.5 | 0.5 | 0.5 |  | 0.5 | 0.5 | 0.5 | 0.5 | 0.5 |  |  |
| Other stabilizers | — | — | — | — | — | — | — | — | e-1 | e-2 | e-2 | e-3 | e-6 | — |
| (parts by weight) |  |  |  |  |  |  |  |  | 0.3 | 0.3 | 1.0 | 0.5 | 0.5 |  |
| Formaldehyde generation (molten resin, ppm) | 17 | 14 | 10 | 6 | 12 | 4 | 2 | 243 | 82 | 68 | 70 | 98 | 425 | 45 |
| Formaldehyde Odor (continuous molding) | A | A | A | A | A | A | A | D | C | C | C | C | D | C |

TABLE 1-continued

|  | EXAMPLES | | | | | | | COMPARATIVE EXAMPLES | | | | | | |
| --- | --- | --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 | 6 | 7 |
| Moldability (amount of mold deposit) | A | A | A | — | A | A | A | D | D | D | D | D | D | B |
| Heat aging (degree of blooming) | A | A | A | B | A | B | A | C | D | D | D | D | D | B |

It will be apparent from Table 1 that compared with the resin compositions according to the comparative examples, the resin compositions according to the working examples are very low in the level of emission of formaldehyde and in the amounts of mold deposits and blooming from the molded articles.

Examples 8–14 and Comparative Examples 8–13

Polyacetal resin was mixed with an antioxidant and the glyoxyldiureide compound in the proportions indicated in Table 2 and the mixtures were respectively melt-extruded using a twin-screw extruder to prepare pelletized resin compositions. From those pellets, testpieces were fabricated with an injection molding machine and the amount of emission of formaldehyde from each testpiece and the formaldehyde odor of the test-piece were evaluated. The results are shown in Table 2.

For comparison, samples prepared without addition of the glyoxyldiureide compound and with or without addition of the conventional stabilizer to polyacetal resin were similarly evaluated.

It will be apparent from Table 2 that the resin articles according to the comparative examples emit large amounts of formaldehyde and emit an intense odor in the odor test. In contrast, the resin articles according to the working examples emit only very small amounts of formaldehyde and are substantially odorless.

Examples 15–25 and Comparative Examples 14–18

One hundred parts by weight of polyacetal resin, 0.3 part by weight of the antioxidant [pentaerythritol tetrakis[3-(3, 5-di-t-butyl-4-hydroxyphenyl)propionate], and varying amounts of the glyoxyldiureide compound and basic nitrogen-containing compound (melamine-formaldehyde resin, melamine, or polyamide resin) as indicated in Table 3 were admixed and melt-extruded with a twin-screw extruder to prepare pelletized resin compositions. From those pellets, testpieces were molded using an injection molding machine. The pellets and test-pieces were evaluated for the amounts of emission of formaldehyde from the molten composition and the molded product, formaldehyde odor during continuous molding, and heat aging quality (surface cracking of the article). The results are shown in Table 3.

TABLE 2

|  | EXAMPLES | | | | | | | COMPARATIVE EXAMPLES | | | | | |
| --- | --- | --- | --- | --- | --- | --- | --- | --- | --- | --- | --- | --- |
|  | 8 | 9 | 10 | 11 | 12 | 13 | 14 | 8 | 9 | 10 | 11 | 12 | 13 |
| Polyacetal resin (parts by weight) | a-1 100 | a-1 100 | a-1 100 | a-1 100 | a-1 100 | a-1 100 | a-2 100 | a-1 100 | a-1 100 | a-1 100 | a-1 100 | a-1 100 | a-2 100 |
| Glyoxyldiureide compound (parts by weight) | b-1 0.5 | b-1 0.3 | b-1 0.5 | b-1 1.0 | b-2 0.3 | b-2 1.0 | b-2 0.1 | — | — | — | — | — | — |
| Antioxidant (parts by weight) | — | d-1 0.5 | d-1 0.5 | d-1 0.5 | d-1 0.5 | d-1 0.5 | — | d-1 0.5 | d-1 0.5 | d-1 0.5 | d-1 0.5 | — | — |
| Other stabilizers (parts by weight) | — | — | — | — | — | — | — | — | e-1 1.0 | e-2 5.0 | e-4 1.0 | e-6 0.5 | — |
| Formaldehyde emission ($\mu g/cm^2$) | | | | | | | | | | | | | |
| dry environment | 0.4 | 0.3 | 0.2 | 0.2 | 0.2 | 0.1 | 0.2 | 18 | 2.8 | 2.1 | 5.0 | 5.8 | 2.3 |
| humid environment | 0.8 | 0.6 | 0.6 | 0.5 | 0.6 | 0.4 | 0.6 | 8.5 | 3.5 | 2.9 | 4.6 | 8.6 | 2.7 |
| Formaldehyde Odor (molded article) | | | | | | | | | | | | | |
| 80° C. × 24 hrs. | A | A | A | A | A | A | A | E | E | E | E | E | E |
| 40° C. × 1 hr. | A | A | A | A | A | A | A | E | D | C | D | D | C |

For comparison, samples prepared without addition of the glyoxyldiureide compound and with or without addition of the melamine-formaldehyde resin were similarly evaluated.

TABLE 3

| | EXAMPLES | | | | | | | | | | | COMP. EXAMPLES | | | | |
|---|---|---|---|---|---|---|---|---|---|---|---|---|---|---|---|---|
| | 15 | 16 | 17 | 18 | 19 | 20 | 21 | 22 | 23 | 24 | 25 | 14 | 15 | 16 | 17 | 18 |
| Polyacetal resin | a-1 | a-1 | a-1 | a-1 | a-1 | a-1 | a-1 | a-1 | a-1 | a-1 | a-1 | a-1 | a-1 | a-1 | a-1 | a-1 |
| (parts by weight) | 100 | 100 | 100 | 100 | 100 | 100 | 100 | 100 | 100 | 100 | 100 | 100 | 100 | 100 | 100 | 100 |
| Glyoxyldiureide compound | b-1 | b-1 | b-1 | b-1 | b-1 | b-1 | b-2 | b-2 | b-1 | b-1 | b-1 | — | — | — | — | — |
| (parts by weight) | 0.3 | 0.3 | 0.5 | 0.5 | 0.5 | 1.0 | 0.3 | 1.0 | 0.3 | 0.5 | 0.5 | | | | | |
| Basic N-compound | c-1 | c-2 | c-3 | c-4 | c-4 | c-4 | c-4 | c-5 | c-6 | c-7 | c-8 | — | c-2 | c-4 | — | c-4 |
| (parts by weight) | 0.3 | 0.3 | 0.3 | 0.1 | 0.3 | 0.3 | 0.3 | 0.3 | 0.1 | 0.3 | 0.3 | | 0.3 | 0.3 | | 0.3 |
| Other stabilizers | — | — | — | — | — | — | — | — | — | — | — | — | — | — | e-5 | e-6 |
| (parts by weight) | | | | | | | | | | | | | | | 0.5 | 0.5 |
| Formaldehyde emission | | | | | | | | | | | | | | | | |
| molten resin (ppm) | 7 | 8 | 5 | 7 | 6 | 3 | 13 | 5 | 9 | 13 | 10 | 265 | 61 | 77 | 130 | 145 |
| dry environment(μg/cm$^2$) | 0.3 | 0.3 | 0.2 | 0.3 | 0.3 | 0.2 | 0.5 | 0.4 | 0.4 | 0.4 | 0.2 | 19 | 2.8 | 3.1 | 3.1 | 2.4 |
| humid environment(μg/cm$^2$) | 0.3 | 0.5 | 0.5 | 0.5 | 0.5 | 0.4 | 0.9 | 0.8 | 0.3 | 0.6 | 0.5 | 20 | 2.9 | 3.4 | 3.6 | 7.2 |
| Formaldehyde odor (continuous molding) | A | A | A | A | A | A | A | A | A | A | A | D | B | B | C | C |
| Heat aging (140° C./30 days) | A | A | A | A | A | A | A | A | A | A | A | C | A | A | A | A |

It will be apparent from Table 3 that compared with the resin compositions of comparative examples, the resin compositions according to the examples are minimal in the emission of formaldehyde and high in heat aging quality.

Thus, the polyacetal resin compositions according to the present invention have been well inhibited against emission of formaldehyde, thus insuring a marked improvement in working environment and in moldability. Furthermore, these compositions feature a reduced emission of formaldehyde from the molded article and, hence, a considerable improvement in the living environment.

The invention claimed is:

1. A shaped article molded from a polyacetal resin composition comprising:
    (i) a polyacetal resin,
    (ii) a glyoxyldiureide compound, and
    (iii) a basic nitrogen-containing compound, an antioxidant or a combination of the nitrogen-containing compound and the antioxidant wherein the proportion of the glyoxydiureide compound is 0.03 to 5 parts by weight, the proportion of the basic nitrogen-containing compound is 0.03 to 5 parts by weight, and the proportion of the antioxidant is 0.05 to 2.5 parts by weight relative to 100 parts by weight of the polyacetal resin, and wherein
    the emission of formaldehyde from the shaped article after standing in a closed space for 24 hours at a temperature of 80° C. is not greater than 1.5 μg per cm$^2$ surface area of the article; and wherein
    the shaped article is a motor vehicle part selected from the group consisting of a vehicle inner handle, a vehicle fuel trunk opener, a vehicle seat buckle, a vehicle assist lap part, a vehicle switch, a vehicle knob, a vehicle lever, a vehicle clip, a vehicle audio equipment part, a vehicle navigation part, a vehicle window regulator carrier plate, a vehicle door lock actuator part, a vehicle mirror part, a vehicle wiper motor system part, and a vehicle fuel system part.

2. The shaped article of polyacetal resin according to claim 1, the emission of formaldehyde after standing for 3 hours in a closed space of saturated humidity at a temperature of 60° C. is not greater than 2.5 μg per cm$^2$ surface area of the article.

3. The shaped article of polyacetal resin according to claim 1, wherein the glyoxyldiureide compound is glyoxyldiureide, a glyoxyldiureide derivative or a metal salt thereof, and the basic nitrogen-containing compound is combined with the glyoxyldiureide or the glyoxyldiureide derivative selected from the group consisting of glyoxyldiureide, $C_{1-4}$ alkyl-substituted glyoxyldiureide, aryl-substituted glyoxyldiureide, and the reaction product of glyoxyldiureide with an amino or imino group-containing compound.

4. The shaped article of polyacetal resin according to claim 1, wherein the glyoxyldiureide compound is a salt of glyoxyldiureide with at least one metal selected from the group consisting of alkali metals, alkaline earth metals, and metals of Group 1B, Group 2B, Group 3B, Group 4B, and Group 8 of Periodic Table of the Elements.

5. The shaped article of polyacetal resin according to claim 1, wherein the glyoxyldiureide compound is aluminum dihydroxy allantoinate.

6. The shaped article of polyacetal resin according to claim 1, containing the glyoxyldiureide compound in a proportion of 0.05 to 2.5 parts by weight relative to 100 parts by weight of the polyacetal resin.

7. The shaped article of polyacetal resin according to claim 1, wherein the basic nitrogen-containing compound is melamine, melamine resin, polyacrylamide or polyamide resin.

8. The shaped article of polyacetal resin according to claim 1, wherein the weight ratio of said glyoxyldiureide compound and said basic nitrogen-containing compound is such that former/latter is 0.5 to 10, and the weight ratio of said glyoxyldiureide compound and said antioxidant is such that former/latter is 0.5 through 10.

9. The shaped article of polyacetal resin according to claim 1, comprising at least one glyoxyldiureide compound selected from the group consisting of glyoxyldiureide, a glyoxyldiureide derivative and a metal salt thereof, and at least one member selected from the group consisting of an antioxidant and a basic nitrogen-containing compound, wherein said basic nitrogen-containing compound is at least one member selected from the group consisting of melamine, melamine resin, polyacrylamide and polyamide resin.

10. The shaped article of polyacetal resin according to claim 9, wherein the metal salt of glyoxyldiureide or its derivative is a bi-through tetravalent metal salt.

11. The shaped article of polyacetal resin according to claim 9, wherein the glyoxyldiureide or its derivative is at least one member selected from the group consisting of glyoxyldiureide, $C_{1-4}$ alkyl-substituted glyoxyldiureide, aryl-substituted glyoxyldiureide, and the reaction product of glyoxyldiureide with an amino or imino group-containing compound.

* * * * *